Sept. 8, 1931.                C. M. RICHARDSON ET AL                1,822,111
                                  CONVEYER SYSTEM
                               Filed May 3, 1927            2 Sheets-Sheet 1
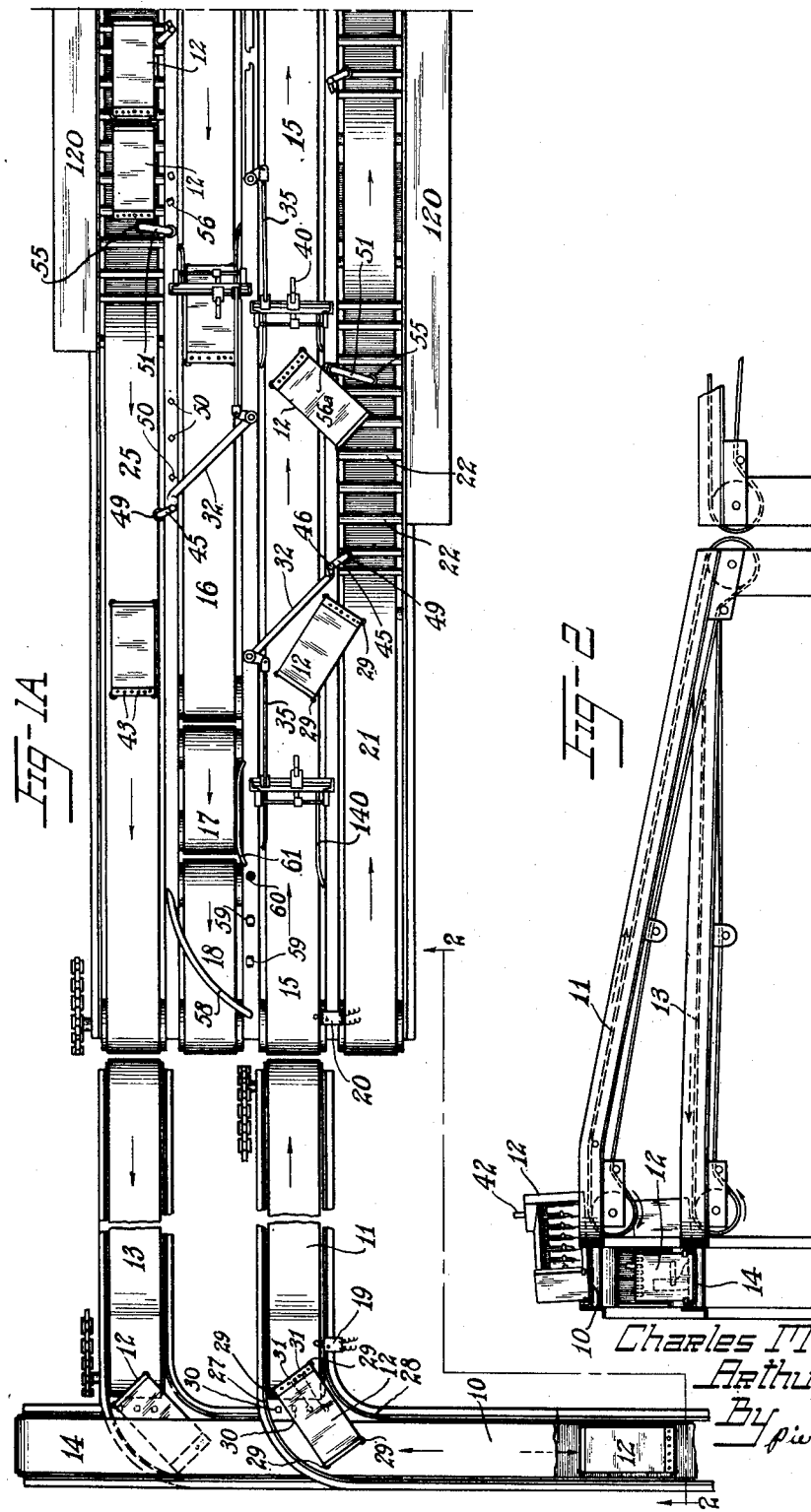

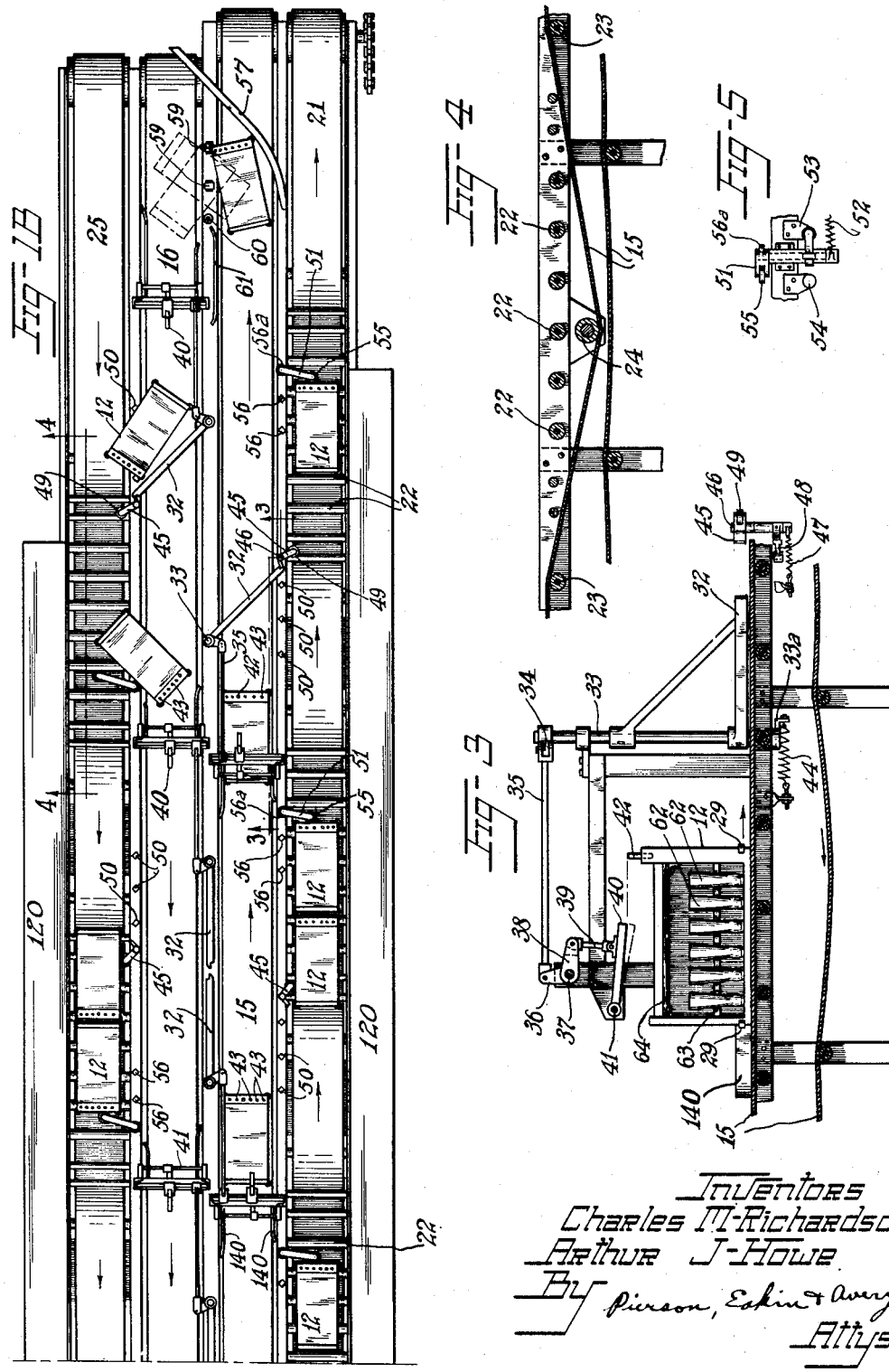

Patented Sept. 8, 1931

1,822,111

UNITED STATES PATENT OFFICE

CHARLES M. RICHARDSON, OF AKRON, AND ARTHUR J. HOWE, OF CUYAHOGA FALLS, OHIO, ASSIGNORS TO THE B. F. GOODRICH COMPANY, OF NEW YORK, N. Y., A CORPORATION OF NEW YORK

CONVEYER SYSTEM

Application filed May 3, 1927. Serial No. 188,502.

This invention relates to methods and apparatus for making rubber products, and especially rubber foot-wear, in the manufacture of which a large number of tacky rubber or rubberized parts are assembled in each article produced and a large number of different types and different sizes of the article are produced in the same work room.

In the manufacture of rubber overshoes the number of different stock units of the same kind of cloth, difficult to distinguish from each other at sight, runs into hundreds and even into thousands in the larger rubber foot-wear factories and heretofore much time has been lost and much stock has been wasted because of the difficulty of keeping the workers at their benches supplied with the necessary kinds of stock pieces without confusion.

Our chief objects are to provide an improved method and improved apparatus whereby these difficulties may be overcome; to provide economy of labor; to avoid waste of material; to facilitate inspection of the work as successive pieces of the stock are built into the product; to reduce the necessary exertion of the workers; to obtain an improved and more uniform product; to avoid confusion of product and of materials;
to provide economy of power and of floor space; and to avoid numerous inconveniences.

Of the accompanying drawings:

Figs. 1—A and 1—B together constitute a plan view of apparatus embodying and adapted to carry out our invention in its preferred form.

Fig. 2 is a vertical section on line 2—2 of Fig. 1—A.
Fig. 3 is a vertical section on line 3—3 of Fig. 1—B.

Fig. 4 is a vertical section on line 4—4 of Fig. 1—B.

Fig. 5 is an elevation of stop mechanism constituting a part of the apparatus.

In the practice of our invention in its preferred form as applied to the manufacture of rubber foot-wear, a group of lasts and the stock pieces required for building all or nearly all of the overshoe are placed upon a conveyance such as a work tray or "car", especially designed to hold the lasts and the work pieces in convenient relation for the selection of work pieces and their application to the lasts, and a plurality of such cars with the lasts and work pieces thereon are circulated by means of a system of conveyors past a series of work stations at each of which one or more operations are performed.

Provision is made for automatically deflecting cars which are ready for a given operation into a work station where that operation is performed and where a full quota of cars is not already on hand, and for continuing the circulation of such a car past stations devoted to such operation in case the station is already filled with cars, the car continuing to be circulated until it reaches such a station having space for receiving it.

The cars and conveyers are so constructed and arranged that when a given operation has been completed with respect to a car the operator may arrange the switching device on the car so that when it is placed back on the circulating conveyer system it will automatically be diverted into the first encountered working station devoted to the next succeeding operation and having less than its full quota of cars on hand.

Referring to the drawings the apparatus as here shown comprises supply conveyers 10 and 11 (Fig. 1) of the conveyer belt type adapted to deliver to the circulating conveyer system successive trays or cars 12, 12 carrying the lasts and the work pieces, and delivery conveyers 13, 14 of the conveyer belt type adapted to receive the cars from the circulating conveyer system and carry them away for subsequent operations such as the vulcanization of the overshoes.

The circulating conveyer system comprises an endless belt conveyer 15 adapted to receive the cars from the conveyer 11 (Fig. 1—A) and, at its delivery end (Fig. 1—B), to pass the cars laterally onto an endless-belt conveyer 16 driven in the opposite direction and adapted to deliver the cars onto a short endless-belt conveyer 17 (Fig. 1—A) which in turn is adapted to deliver them onto a short endless-belt conveyer 18 having provision for passing the cars laterally therefrom back onto the conveyer 15 adjacent the end thereof at which the cars are initially received.

Provision is made for continuously driving the conveyers 15, 16 and 18 at the same speed and a separate electric circuit including a stop switch 19 and a starting switch 20 is provided for driving the short conveyer 17. The stop switch 19 is mounted near the upper or receiving end of the conveyer 11 in position to be actuated by contact of a car 12 passing that position, to stop the drive of the short conveyer 17 and thus delay any car that may be upon the conveyer 17 and prevent it from colliding at the receiving end of the conveyer 15 with the car which actuates the switch 19. The conveyer 11 is of such length that any car already upon the conveyer 18 at the time the switch 19 is actuated will have time to pass onto the conveyer 15 before the switch-actuating car arrives at the transfer position. The starting switch 20 is mounted over the receiving end of the conveyer 15 in such position that a car actuating it to start the conveyer 17 will pass forward from the receiving end of the conveyer 15 a sufficient distance to permit the car from the conveyer 17 to be received behind it.

Mounted at the outer side of the conveyer 15 and extending along the same is an endless belt conveyor 21 having its upper reach guided under successive series of loosely journaled rolls such as the rolls 22, 22, by guide-rolls such as the rolls 23, 24, 23 (Fig. 4), each set of rolls 22 constituting a work station. Along the work station is mounted a work bench 120.

A similar construction including an endless belt conveyer 25 is mounted at the outer side of the conveyer 16, providing working stations along the latter, and the conveyer 25 is adapted to deliver the cars with the finished work thereon to the delivering conveyer 13.

The upper reach of the conveyer 15 and the conveying reaches of the conveyer 21 are preferably level with each other and the two conveyers are preferably driven at the same speed. The same arrangement is preferred with respect to the conveyers 16 and 25, and the upper reaches of the conveyers 15 and 16 also are preferably level with each other.

For transferring the cars from one conveyer to another at the same level, diverting devices are provided constituting the subject matter of a patent of the undersigned Arthur J. Howe, No. 1,733,409, dated October 29, 1929.

For transferring the cars from the supply conveyer 10 to the supply conveyer 11 (Fig. 1—A) outer and inner guide-rails 27, 28, curved at the turn, are mounted just over the two conveyer belts and adapted to coact with projecting guide-rollers 29, 29 mounted, on vertical axes, on the corners of the car, and supporting and guiding rollers 30, 30 are journaled on horizontal axes between the conveyer belt 10 and the conveyer belt 11 with their tops slightly higher than the adjacent portions of the conveyer belts and with their axes parallel with the belt 10, so that when the front end of the car is diverted by the guide-rail 27 into contact with one or more of them the front end of the car will be slightly lifted in riding up over the roller or rollers, the rear end of the car remaining in driving contact with the belt 10 until the car over-balances upon the rollers 30 and thus brings its front end into driving contact with the belt 11, which then draws the car forward onto itself from the rollers 30, the rear end of the car, being raised out of contact of the belt 10, being free to swing about the turn to bring the car into proper alignment upon the belt 11.

For so swinging the rear end of the car without sliding contact of the side of the car against the inner guide-rail 28, rollers 31, 31 are journaled adjacent the rollers 30, nearer the inside of the turn, with their tops at the same height as those of the rollers 30, the rollers 31 being mounted with their axes substantially radial with respect to the turn, at about 45° to the conveyers 10 and 11.

For diverting the cars from the conveyer 15 to the conveyer 21 or from the conveyer 16 onto the conveyer 25, to pass the car into a work station, a deflector arm 32 (see Figs. 1—B and 3), just clearing the upper reach of the first conveyer, 15 or 16, is secured upon a vertical shaft 33 journaled in the framing at the back side of the conveyer and having secured on its upper end an arm 34 connected by a link 35 with an arm 36 rising from a horizontal rock-shaft 37 journaled in the framing and disposed transversely over the conveyer. The rock-shaft 37 has a horizontal arm 38 secured thereon at a position longitudinally thereof determined according to whether one or another type of operation is to be performed upon the work carried by the car which is to be diverted by the arm 32 into the particular work station. The outer end of the arm 38 is connected by a link 39 with a cam arm 40 which is pivoted at 41 in the framing and is adapted to be lifted, to swing the arm 32 into diverting position, by a pin 42 mounted in one of a series of holes 43, 43 provided in the top of the frame of the car, the pin being adapted to be mounted in one or another of the holes 43 according to whether it is desired to have the car diverted into one or another of the work stations, the position of the holes 43 corresponding respectively with the positions of the cam arms 40 at the several work stations. Guide-rails 140, 140 are provided at the respective sides of the conveyer to assure alignment of the car for proper alignment and coaction of the pin 42 with the arm 40.

For urging the diverting arm 32 toward its inoperative position at the side of conveyer over which it swings, an arm 33ª is secured upon the lower end of the vertical shaft 33 below the framing and is connected with a part of the framing by a pull-spring 44, the spring being adapted to be overcome by the force of the cam arm 40 in swinging the diverting arm 32 to diverting position.

For latching the arm 32 in diverting position to hold it there until the pin 42 has passed from the cam lever and until the car has been diverted onto the adjacent conveyer, 21 or 25, and for then releasing the arm 32 to permit it to be returned by the spring 44 to inoperative position, a bell-crank latch 45 is pivoted on a vertical axis 46 between the two conveyers and is urged by a spring 47 to a position against a stop 48 such that the outer end of the arm 32 in swinging to diverting position will turn the latch about the pivot 46 against the force of the spring 47 and automatically latch upon the adjacent arm of the latch, as shown in Fig. 1—B. The other arm of the latch extends over the conveyer to which the car is diverted and is provided with a roller 49 adapted to be engaged by the side of the car after the car obtains adequate driving contact with the second conveyer, to turn the latch 45 to release the diverting arm 32 and permit the latter to return to inoperative position, for the passage of such cars as are not destined for the particular work station.

The roller 49 also is adapted to remain in engagement with a car standing in the work station, to hold the latch 45 in inoperative position, so that succeeding cars, although having pins 42 so set as to actuate the cam lever 40 and diverting arm 32, will be rejected by the work station, the arm 32 swinging to diverting position but immediately returning to inoperative position when the pin 42 passes the cam arm 40, without diverting the car. Each work station is preferably of such length as to hold a plurality of cars, each station here shown being adapted to accommodate two of the cars, and the construction is such that cars will be rejected by the station only when the station is full.

To facilitate the transfer of the cars from the conveyer 15 to the work station of the conveyer 21 or from the conveyer 16 to the work station of the conveyer 25, a set of rollers 50, 50 are mounted between the two conveyers with their tops slightly above the level of the latter and with their axes so disposed that the peripheral movement of their tops will be in a direction diverging from the diverting face of the arm 32 at a slight angle, such as an angle of 3 to 5 degrees, so that as soon as the leading end of the car has been diverted by the deflector arm 32 into contact with one or more of the rollers and has been caused to ride thereon the roller or rollers will cause the front end of the car to move laterally more rapidly than it would be deflected by the arm 32, so that the car moves out of contact with the arm 32 and avoids frictional wear, with consequent reduction of strain and power consumption, the car continuing to be driven over the rollers 50 by contact of its rear end upon the conveyer from which it is being diverted. As soon as the car over-balances on the rollers 50 and thus obtains driving contact on its leading end with the conveyer to which it is being diverted the rear end of the car, rising out of contact with the first conveyer, is swung over into alignment upon the second conveyer by the angularly-positioned supporting and diverting rollers 50, the general result of the operation being that the car is transferred from one conveyer to the other with very little sliding contact with the diverting arm 32 or with the rollers 50 or with either of the conveyers.

For stopping the foremost car in the work station upon the idler rolls 22 a stop arm 51 is pivoted upon the frame structure between the two conveyers and is yieldingly urged toward stopping position by a hub-spring 52, a stop 53 being provided holding the arm in position to stop the car and a stop 54 being provided to prevent the arm from being swung over the adjacent circulating conveyer. The arm 51 is adapted to be swung against the stop 54 by hand to permit the car 12 to be shoved past it on occasion, for conveyance of the car upon the work station conveyer to the next work station. The outer end of the arm is provided with an anti-frictional roller 55 which is adapted to run on the side of the car after the leading end of the car has passed it, so that the stop arm will be held out of stopping position until the car is past and then will be swung back to stopping position by the spring 52.

For facilitating the transfer of a car from the work station back to the circulating conveyer, guide and supporting rollers 56, 56 (Fig. 1—B) are mounted on the frame between the work station and the circulating conveyer with their axes at an angle of about 45° to the conveyer and with their tops slightly above the conveyers, so that when the car is shifted onto them by hand they will function in substantially the same manner as the rollers 50, 50 above described, to swing the rear end of the car onto the circulating conveyer as the car is drawn forward upon the latter by the contact of the front end of the car with the circulating conveyer. A roller 56ª mounted in the hub of the stop-arm 51 is provided for assisting the rollers 56 in aligning the car upon the circulating conveyer.

For transferring cars from the conveyer 15 onto conveyer 16, as shown at the right-hand end of Fig. 1—B, or from the conveyer 18 onto the conveyer 15, as shown near the left-hand end of Fig. 1—A, a curved deflector 57 or 58 is fixedly mounted just over the conveyer from which the car is to be transferred and a pair of rolls 59, 59 are mounted between the two conveyers, on a common horizontal axis parallel with the conveyers, with their tops slightly above the level of the conveyers, so that as the front end of the car rides upon them the car will continue to be driven by contact of its rear end with the first conveyer until it over-balances on the rolls, whereupon, its rear end lifting from the first conveyer, it will be turned about and driven in the opopsite direction upon the second conveyer by the contact of its front end with the second conveyer, the position of the rollers being such as to cause its rear end then to be swung over into alignment on the second conveyer.

A roller 60 journaled upon a vertical axis, or similar guide means, may be mounted at the inside of the turn to supplement the aligning action of the rollers 59 if necessary, and a guide-rail 61 may be mounted at the inside of the turn, adjacent the roller 60, to assure proper alignment of the car as it approaches the turn.

Each car consists of a box with its front side open for access to a group of lasts 62, 62 (Fig. 3) standing upon its floor, and for holding the lasts in order and in upright position a bracket or bridge piece 63 is mounted in the box in horizontal position at about half the height of the lasts and is formed with a series of notches in its front edge each adapted to receive the shank portion of a last to give it lateral support.

Near its top the box is provided with a horizontal shelf 64 adapted to support the supply of stock pieces appropriate to be assembled upon the lasts of the group, the stock pieces preferably being stacked in liners in such order that in the successive operations the top ones will be used first and the bottom ones last.

In the use of this apparatus for the practice of our invention the successive cars, each with its set of lasts and stock pieces properly assembled thereon, and with its pin 42 properly set to divert the car into a work station where the first building operation is being performed, are received from the conveyer 10 onto the conveyer 11 and from the latter onto the conveyer 15.

At the first such work station reached by the car the car is automatically diverted into the station by the mechanism including the diverting arm 32, unless the station already contains its full quota of cars, in which case the car last received in the station, by holding the latch 45 in inoperative position as above described, permits the diverting arm 32, swung to diverting position by the car's pin 42 and the cam arm 40, to be swung back to inoperative position by the spring 44 before the car reaches it, so that the car proceeds upon the conveyer 15, and possibly makes the circuit of the conveyers 15, 16, 17, and 18 repeatedly, until it finds a first-operation work station having room for it, whereupon it is automatically diverted into such station.

There the operator removes the lasts 62 from the car to the work bench 120 and performs the first operation upon them, taking stock pieces from the car and returning each last to the car as the operation is completed, and resets the pin 42 for diversion of the car into a station at which the second operation is being performed.

The operator then shoves the car into an over-balanced position upon the rollers 56 so that the conveyer 15 receives the car's forward end and draws it forward, the rollers 56, because of their angular position, causing its rear end to swing over into alignment upon the conveyer, as it is drawn around the roller 56$^a$.

The car then proceeds as before for the second and additional operations upon the work, and when the last of the operations has been completed with respect to a car, the pin is set for diversion of the car from the conveyer 16 onto the conveyer 25 by the last diverting arm 32 on the conveyer 16 (Fig. 1—A), beyond the last work station of the conveyer 25, the diverting arm then being unlatched by contact of the car with the adjacent latch-roller 49, and the car is carried away to the vulcanizers, for example, by the conveyers 25, 13 and 14.

In the circulation of cars seeking an open station collision of such cars with cars coming in from the conveyer 11 is prevented by stoppage of the conveyer 17, through actuation of the stop switch 19 by a car passing the same, the conveyer 17 remaining stopped until the incoming car actuates the starting switch 20, so that no car leaves the conveyer 17 while an incoming car is on the in-feed conveyer 11.

Our invention results in much saving of time, labor and stock, in orderliness of procedure and avoidance of confusion, economy of floor space and of power consumption, and in the other advantages expressed and implied in the above statement of objects.

The method described herein is described and claimed in our divisional Patent No. 1,792,322, dated February 10, 1931, the claim herein being directed to the apparatus.

Many modifications are possible within the scope of the appended claims.

We claim:

1. Conveyer apparatus for the manufacture of articles each comprising a plurality of assembled parts, the said apparatus comprising a plurality of conveyances each adapted to support a group of separate stock pieces adapted to constitute parts of one of the articles, supporting means constituting a series of work stations, means for moving the conveyances in succession from station to station, means for automatically lodging the conveyances in work stations not fully occupied, means controlled by the presence of conveyances at the work station for moving the conveyances past fully occupied work stations in an endless-circuit until they are received at a work station not fully occupied, and means for diverting conveyances from the endless-circuit when the work thereon has been subjected to all of the operations performed at the work stations.

2. Conveyer apparatus comprising a pair of juxtaposed, parallel conveyers, means for driving them in opposite directions, means for diverting articles from the delivery end of each of the conveyers onto the receiving end of the other, constituting them an endless-circuit conveyer system, a conveyer on the outside of each of the first said conveyers and constituting a series of work stations, and means for diverting articles from each of the endless-circuit conveyers onto the adjacent work-station conveyer.

3. Conveyer apparatus comprising main conveyer means, respective conveyer means for delivering work thereonto along different paths, and control means for automatically so controlling movement of work on one of the said delivering conveyer means with relation to that on the other as to prevent collision of incoming work with work already on the main conveyer means, the said control means comprising contact means associated with one of the delivering conveyer means for actuation by the work to stop the drive of the other delivering conveyer means and contact means associated with the main conveyer means for actuation by the work to start the said drive.

4. Conveyer apparatus for the manufacture of articles, the said apparatus comprising supporting means constituting a series of work stations, conveyer means for moving units of the work in succession from station to station in an endless circuit, and means controlled by the condition of the station as to the presence of the work thereon, and by the condition of said units, for controlling the course of the said units of the work with relation to the station.

5. Conveyer apparatus comprising endless-circuit conveyer means, conveyer means for delivering work thereonto, supporting means constituting a series of work stations along said endless-circuit conveyer means, a plurality of conveyances adapted to be distributed by said endless-circuit conveyer to said work stations, and automatic means selectively operable by said conveyances, and operative only when a work station is not filled, for diverting conveyances from said conveyer means to a work station.

In witness whereof we have hereunto set our hands this 30th day of April, 1927.
CHARLES M. RICHARDSON.
ARTHUR J. HOWE.